(12) United States Patent
Zaccardi et al.

(10) Patent No.: US 11,346,247 B2
(45) Date of Patent: May 31, 2022

(54) TURBINE ENGINE INCLUDING A HEAT EXCHANGER FORMED IN A PLATFORM

(71) Applicant: SAFRAN AIRCRAFT ENGINES, Paris (FR)

(72) Inventors: Cedric Zaccardi, Moissy-Cramayel (FR); Alexandre Bernard Marie Boisson, Moissy-Cramayel (FR); Christophe Marcel Lucien Perdrigeon, Moissy-Cramayel (FR); Catherine Pikovsky, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 83 days.

(21) Appl. No.: 16/809,637

(22) Filed: Mar. 5, 2020

(65) Prior Publication Data

US 2020/0284160 A1 Sep. 10, 2020

(30) Foreign Application Priority Data

Mar. 8, 2019 (FR) ...................... 19 02395

(51) Int. Cl.
F01D 25/12 (2006.01)

(52) U.S. Cl.
CPC ........ F01D 25/12 (2013.01); *F05D 2220/323* (2013.01); *F05D 2260/221* (2013.01)

(58) Field of Classification Search
CPC .............................. F01D 11/008; F01D 25/12
See application file for complete search history.

(56) References Cited

U.S. PATENT DOCUMENTS

| 7,377,098 B2 * | 5/2008 | Walker | F01D 9/065 60/39.08 |
| 2006/0042223 A1 * | 3/2006 | Walker | F01D 25/162 60/39.08 |

(Continued)

FOREIGN PATENT DOCUMENTS

| CA | 2 697 741 A1 | 10/2010 |
| EP | 2 762 685 A1 | 8/2014 |

(Continued)

OTHER PUBLICATIONS

French Preliminary Search Report dated Oct. 10, 2019 in French Application 19 02395 filed on Mar. 8, 2019 (with English Translation of Categories of Cited Documents), citing documents AA & AO-AR therein, 2 pages.

*Primary Examiner* — Ninh H. Nguyen
*Assistant Examiner* — John S Hunter, Jr.
(74) *Attorney, Agent, or Firm* — Oblon, McClelland, Maier & Neustadt, L.L.P.

(57) ABSTRACT

A turbine engine of an aircraft includes: a primary air flow duct; a secondary air flow duct which is located around the primary duct, the secondary duct including a stator including a plurality of blades distributed around a main axis of the turbine engine and inter-blade platforms located between radially internal ends or between radially external ends of two adjacent blades, each platform including a wall partially delimiting the secondary duct; and a fluid circuit which includes a heat exchanger formed by at least one of the platforms. The platform includes a line that has an inlet port of the fluid and a fluid outlet port. The fluid circuit includes a distributor associated with each port of the at least one platform with the rest of the fluid circuit and of which each distributor is axially offset with respect to the platform along the main axis.

10 Claims, 5 Drawing Sheets

(56) References Cited

U.S. PATENT DOCUMENTS

| | | | |
|---|---|---|---|
| 2014/0209286 A1* | 7/2014 | Freund | F01P 3/12 |
| | | | 165/168 |
| 2016/0131035 A1 | 5/2016 | Diaz et al. | |
| 2016/0160758 A1* | 6/2016 | Marchaj | F02K 3/06 |
| | | | 60/779 |
| 2018/0087392 A1* | 3/2018 | Chalaud | F01D 9/04 |

FOREIGN PATENT DOCUMENTS

| | | |
|---|---|---|
| EP | 3 070 317 A1 | 9/2016 |
| FR | 3 028 576 A1 | 5/2016 |

\* cited by examiner

TURBINE ENGINE INCLUDING A HEAT EXCHANGER FORMED IN A PLATFORM

TECHNICAL FIELD

The invention relates to a turbine engine, such as a turbine engine of an aircraft including means for cooling a component located in the vicinity of a main axis of the turbine engine.

The invention more particularly relates to a turbine engine including means for cooling a low-pressure rotating shaft and/or pressurisation chambers of lubrication oil.

PRIOR ART

A conventional turbine engine has a stator and a rotor which are guided in rotation by bearings. In addition, pinions are present in the body of the turbine engine to take mechanical energy from the rotor, so as to power the accessories of the turbine engine, such as pumps, generators, through in particular a component commonly referred to as Accessory Gear Box (AGB).

Certain turbine engines also include epicyclic reduction gears which propose substantial reduction ratios.

A film of oil must be sent onto these components of the turbine engine in order to lubricate them and cool them. This oil used then has to be cooled.

According to a known embodiment, the oil is cooled by a heat exchanger of the oil-fuel type, wherein the fuel is used as a cold source. This embodiment has the advantage of heating the fuel which is very cold when the turbine engine is used on an aircraft flying at an altitude.

However, the performance of such heat exchangers is decreasing with the current trend of turbine engines to limit their fuel consumption, which reduces the flow rate of fuel in the heat exchanger.

Another way to cool the oil is through an air-oil exchanger for which the cold source is formed by the air flowing in the secondary duct In order to allow for such a heat exchange, it has been proposed to circulate the oil in one or more reconstitution platforms of the secondary duct, which are located at the radial ends of each blade.

However, the space between each platform and the inter-duct compartment is limited and already occupied by many other components, which renders the connecting of the heat exchanger difficult to set up, all the more so when the heat exchanger is formed by several platforms.

A purpose of the invention is to propose a turbine engine including means for cooling of which the implementation is simplified.

DISCLOSURE OF THE INVENTION

The invention proposes a turbine engine for aircraft including a primary air flow duct and a secondary air flow duct which is located around the primary duct, the secondary duct including a stator including a plurality of blades distributed around a main axis A of the turbine engine and which includes inter-blade platforms each one of which is located between the radially internal ends or between the radially external ends of two adjacent blades, each platform including a wall partially delimiting the secondary duct, and including a fluid circuit, in particular lubrication fluid, that supplies at least one component of the turbine engine, wherein the fluid circuit includes a heat exchanger carrying out a heat exchange between said fluid and the flow of air flowing in the secondary duct, which is formed by at least one of the platforms, through which said at least one platform the fluid flows, the platform including a line that has an inlet port of the fluid and a fluid outlet port, characterised in that the fluid circuit includes a distributor associated with each port, of said at least one platform with the rest of the fluid circuit and of which each distributor is axially offset in relation to said platform according to the main axis A in one direction or the other.

Each distributor makes it possible to offset a portion of the components of the cooling circuit to a position in the turbine engine which is easier to access.

Preferably, the heat exchanger is formed by several platforms which are distributed around the main axis A and in that each distributor is connected to the same port, of all the platforms forming the heat exchanger.

Preferably, each distributor includes a line curved to form a ring centred on the main axis A of the turbine engine and a coupling associated with each platform, connecting the line to a port, of the platform.

Preferably, each platform includes a first port located at a first axial end of the platform and a second port located at a second axial end of the platform, and the distributors are disposed axially facing each axial end of the platform.

Preferably, the two ports of the platform are located at the same axial end of the platform, and the distributors are disposed axially facing this axial end of the platform.

Preferably, the fluid circuit includes, in the direction of flow of the fluid in the fluid circuit:
a fluid reservoir;
a supply line of said component of the turbine engine extending from the fluid reservoir to the component;
said component
an upstream section extending from the component to the heat exchanger;
a first distributor;
said at least one platform;
a second distributor;
a downstream section extending from the second distributor to the fluid reservoir.

Preferably, said wall of the platform includes at least one protruding fin extending inside the secondary duct.

Preferably, said at least one fin extends mainly according to the direction of the main axis A.

Preferably, said at least one platform includes a line wherein the fluid flows and which is connected to the two ports.

Preferably, the line is made from a single piece with at least one portion of the platform.

Preferably, the line consists of a cavity formed in a body of said at least one platform and said wall of the platform is added onto the body and partially delimits the cavity.

Preferably, the line consists of an insert which is fixed to the wall of the platform.

BRIEF DESCRIPTION OF THE DRAWINGS

Other characteristics and advantages of the invention shall appear when reading the following detailed description for the understanding of which reference will be made to the accompanying figures among which.

DETAILED DESCRIPTION

Figure 1:
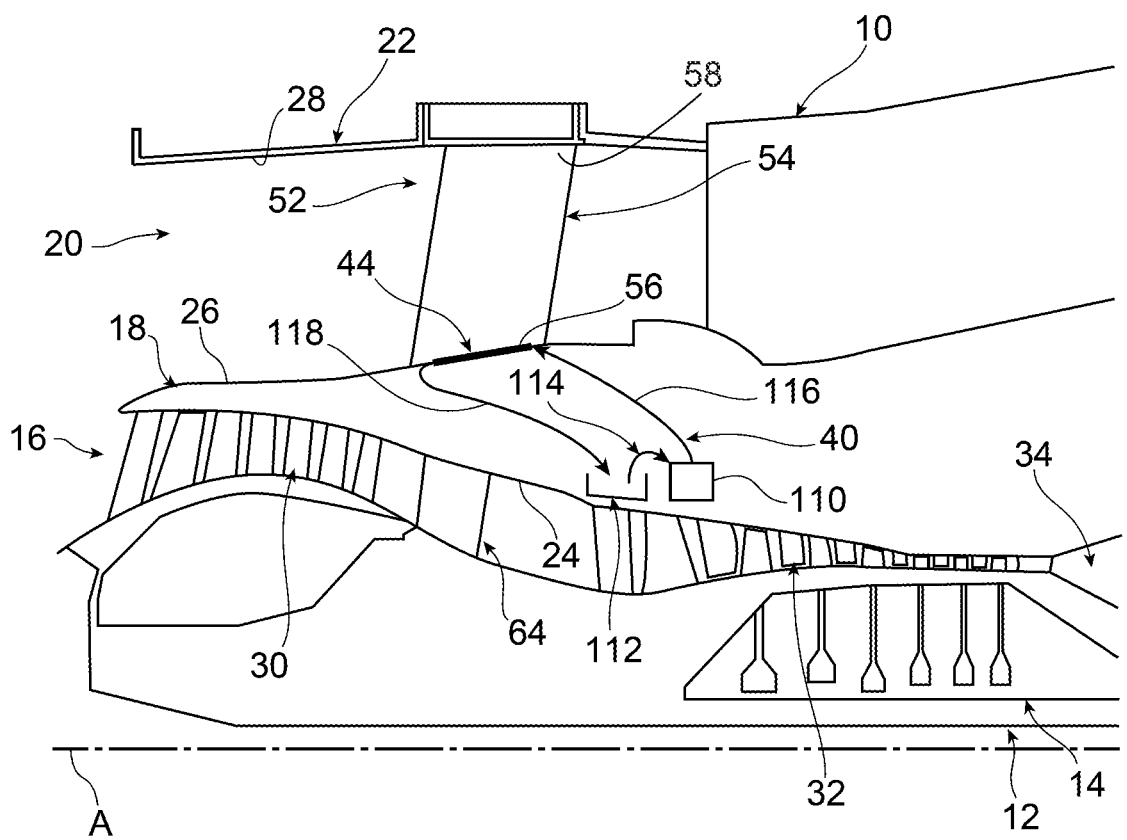
FIG. 1 diagrammatically shows as an axial cross-section a turbine engine of an aircraft including a pressurised air circuit carried out according to the invention.

FIG. 1 shows a turbine engine 10 of an aircraft.

The turbine engine 10 includes, moving away from its main axis A, a low-pressure shaft 12, a high-pressure shaft 14, a primary air flow duct 16, a secondary air flow duct 20, an inter-duct compartment 18 that separates the primary duct 16 and the secondary duct 20 and a ferrule 22 of an intermediate casing.

The inter-duct compartment 18, also called "core compartment", is delimited radially by a radially internal wall 24 delimiting the exterior of the primary duct 16 and a radially external wall 26 delimiting the interior of the secondary duct 20. The ferrule 22 includes a radially internal wall 28 delimiting the exterior of the secondary duct 20.

The primary duct 16 includes, from upstream to downstream, according to the direction of the flow of air in the primary duct 16, i.e. here from left to right in reference to FIG. 1, a low-pressure compressor 30, a high-pressure compressor 32, a combustion chamber 34, a high-pressure turbine and a low-pressure turbine (not shown).

The secondary duct 20 includes a stator 52 the purpose of which is to direct the flow of air flowing in the secondary duct 20, so that the secondary duct 20 has an axially oriented flow.

The stator 52 includes a plurality of blades 54 regularly distributed around the main axis A of the turbine engine 10 which act on the flow of air circulating in the secondary duct 20 to direct the air flow in the main axis of the turbine engine 10.

Each blade 54 extends mainly radially in relation to the main axis A and includes a radial root end 56 radially internal for its connection with the inter-duct compartment 18 and a radial head end 58 radially external for its connection with the ferrule 22.

The radially external wall 26 of the inter-duct compartment 18 and the radially internal wall 28 of the ferrule 22 each include connecting zone (not shown) at which the blades 54 are connected, which is for example an annular boss.

Figure 2:
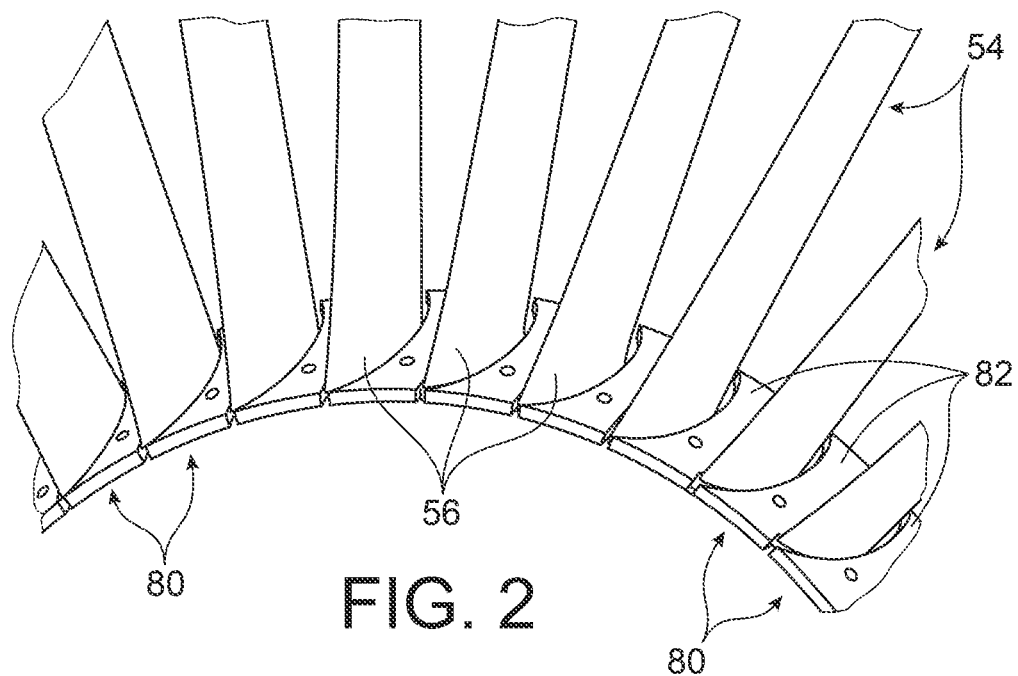
FIG. 2 is a detail in perspective on a larger scale of a portion of the stator showing the installations of inter-blade platforms arranged at the hub of the turbine engine.

As can be seen for example in FIG. 2, platforms 80 are disposed between the roots 56 of the adjacent blades 54. Each one of these platforms 80 includes a wall 82 which forms a ring sector coaxial to the main axis A. The set of walls 82 of the platforms 80 forms a ring that extends the radially external wall 26 from the inter-duct compartment 18, to the connecting zone.

Therefore, similar platforms (not shown) are arranged between the heads 58 of the blades 54, each one of these platforms includes a wall that forms a ring sector coaxial to the main axis A, to extend the radially internal wall 28 from the ferrule 22, to the connecting zone.

Thus, the wall 82 of each platform 80 partially delimits the secondary duct 20.

Figure 4:
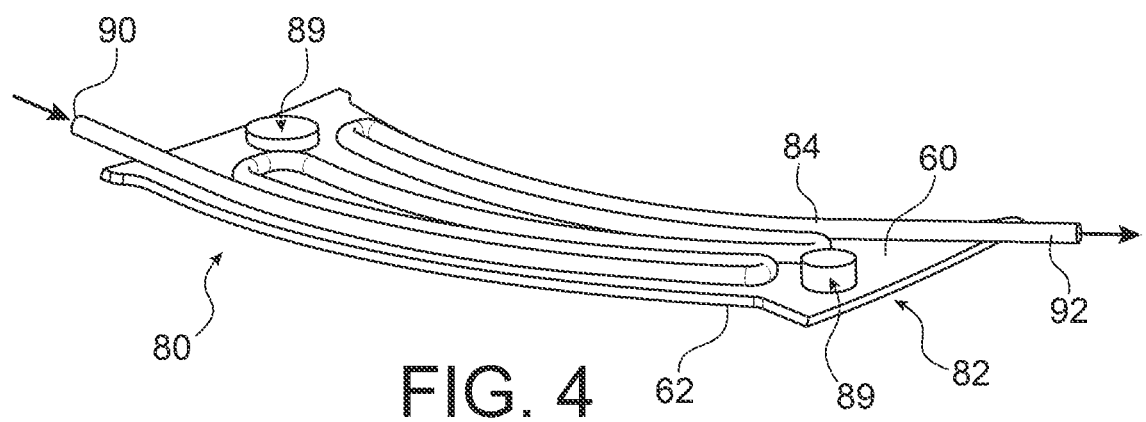
FIG. 4 is a view showing a way to render the line integral with a body of the platform.

Each platform 80 further includes means for the fastening thereof to the inter-duct compartment 18 or to the ferrule 22. Such means for fastening are for example fastening studs 89 mounted on an internal face 60 of the wall 82 of the platform 80, as shown in FIG. 4.

The turbine engine 10 further includes lubrication fluid circuits 40 which are distributed inside the lubrication fluid circuits 40 to lubricate several components of the turbine engine 10, such as for example to lubricate a guide bearing of the low-pressure shaft 12 or a speed reducer (not shown) which is arranged between the low-pressure shaft 12 and the fan of the turbine engine.

The speed reducer makes it possible to dissociate the rotation speed of the fan with that of the low-pressure shaft 12 by which the fan is driven. This makes it possible in particular to reduce the rotation speed of the blades of the fan in relation to that of the low-pressure compressors, and thus to optimise their respective effectiveness and therefore to improve the propulsion efficiency. Such a reducer is particularly advantageous in the case of a turbine engine with a high dilution ratio, i.e. for which the relationship between the quantity of the flow of air flowing in the secondary duct 20.

A high dilution ratio makes it possible to reduce the consumption of the engine, but leads to large fan sizes. The rotation speed of the fan is then limited, and limits by as much that of the low-pressure compressor and of the low-pressure turbine.

The component 110 which is lubricated by the fluid is itself at a high temperature, which heats the fluid coming into contact with this component.

Thus, the fluid circuit includes a heat exchanger 44 which is disposed downstream from the component 110 and the purpose of which is to cool the fluid.

As can be seen as a non-limiting example in FIG. 1, the fluid circuit 40 intended for the lubrication of a component 110 includes, according to the direction of flow of the lubrication fluid in the fluid circuit 40: a fluid reservoir 112, a supply line 114 of said component 110 of the turbine engine 10 extending from the fluid reservoir 112 to the component 110, said component 110, an upstream section 116 extending from the component 110 to the heat exchanger 44 and a downstream section 118 extending from the heat exchanger 44 to the fluid reservoir 112.

The heat exchanger 44 is of the air-oil type and the source of cold air is formed by the air circulating in the secondary duct 20.

The heat exchanger 44 is thus located at the secondary duct 20, as shall be described hereinafter.

As was stated hereinabove, the source of cold air of the heat exchanger 44 is formed from air circulating in the secondary duct 20.

Figure 3:
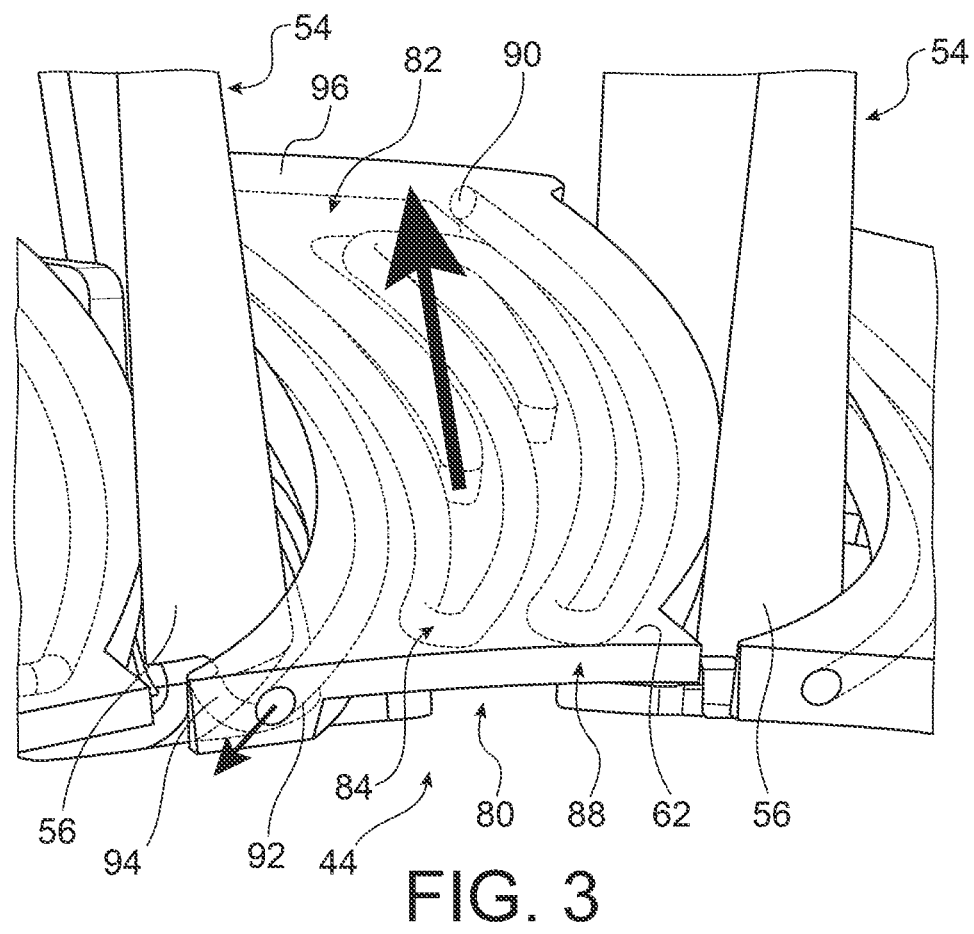
FIG. 3 is a detail on a larger scale of a platform shown in FIG. 2, including a line for the circulation of the pressurised air flow.
Figure 5:
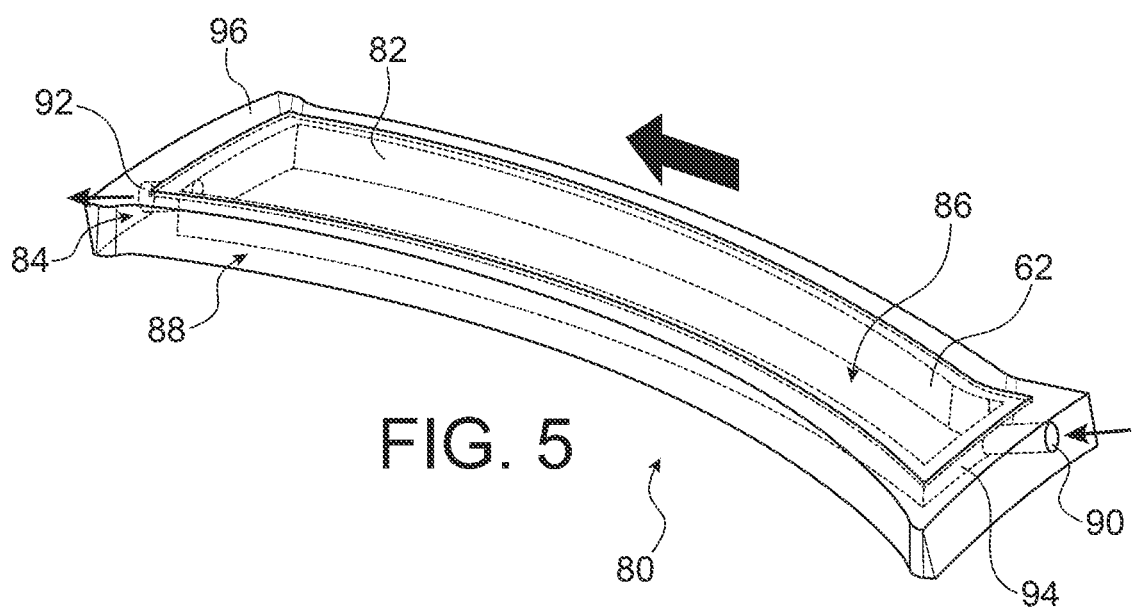
FIG. 5 shows another embodiment of the platform including a cavity and an added plate.

As can be seen in FIGS. 3 to 5, the heat exchanger 44 is formed by at least one platform 80, through which the fluid flows, to exchange heat with the air flowing in the secondary duct 20.

According to an embodiment, the heat exchanger 44 is formed by a single platform 80. According to another embodiment, the heat exchanger is formed by a plurality of platforms 80 which are distributed around the main axis A of the turbine engine.

Regardless of the embodiment of the heat exchanger 44, whether it includes a single platform 80 or several platforms 80, each platform 80 of the heat exchanger 44 includes a line 84 which is arranged in the inside volume thereof. This line 84 is passed through by the flow of fluid and it is in thermal contact with the wall 82.

The wall 82 of the platform 80 then carried out a heat exchange between the fluid and the air flowing in the secondary duct 20.

According to a first embodiment that can be seen in FIGS. 3 and 4, the line 84 is of tubular shape and it is arranged inside the platform 80 by forming a coil for example.

According to a first aspect of this first embodiment, and as can be seen in FIG. 4, the line 84 consists of an element added to the wall which is integral with the wall 82 of the platform 80 by welding and a heat exchange by contact is possible between the line and the wall 82.

According to this first aspect, the platform 80 is formed solely by the wall 82 which carries the line 84 on the internal face 60 thereof opposite the face 62 that reconstitutes the secondary duct. Means of thermal conduction such as a thermal paste can be interposed between the wall 82 of the platform 80 and the line 84 to favour the heat exchange between the two elements.

According to a second aspect of this first embodiment, and as can be seen in FIG. 3, the line 84 is made from a single piece with the wall 82 of the platform 80.

For this, the platform 80 is formed during the carrying out of the platform 80. For example, the platform 80 and the line 84 are formed simultaneously during a moulding operation or additive manufacturing.

According to an alternative embodiment, the platform 80 is carried out in a single piece, by moulding or by additive manufacturing and the line 84 is then formed in the platform 80 by removing material, for example by machining of the platform 80.

According to a second embodiment shown in FIG. 5, the line 84 includes a cavity 86 formed in the platform 80. This cavity 86 delimits a substantial volume which makes it possible to facilitate the exchanges of heat between the flow of fluid and the flow of air flowing in the secondary duct.

According to a first aspect of this second embodiment, the platform 80 is carried out in two portions, and includes a body 88 on which the wall 82 is added.

The cavity 86 is carried out in the body 88 of the platform 80. The cavity 86 is open in a face of the body 88 oriented radially towards the secondary duct 20 and the opening formed is closed off by the wall 82 of the platform 80, making it possible to create a direct thermal contact of the fluid flow with the wall 82.

According to a second aspect of this second embodiment, the platform 80 is carried out in a single piece wherein the cavity 86 is formed. Preferably, such a platform 80 is carried out by additive manufacturing.

Figure 6:
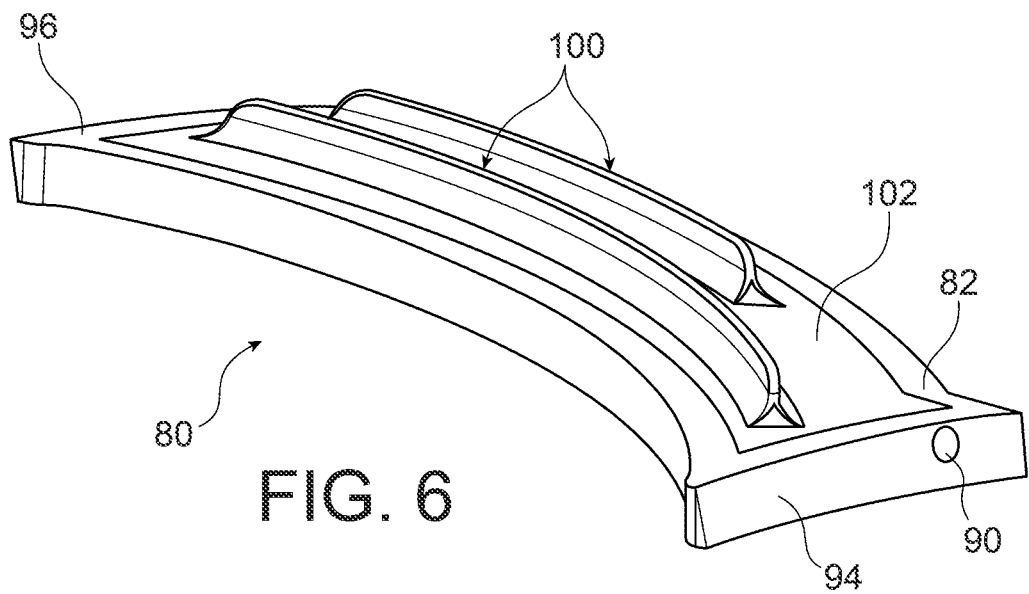
FIG. 6 diagrammatically shows in perspective a platform including a line and fins that favour the thermal exchange.

FIG. 6 shows an alternative embodiment wherein the wall 82 carries at least one fin 100 mounted on a face 102 of the wall 82, this face 102 being in contact with the flow of air in the secondary duct 20.

Here, according to the embodiment shown, the wall 82 carries two fins 100. It will be understood that the invention is not limited to a wall carrying only two fins 100 and that the wall 82 can carry a single fin 100 or more than two fins 100.

Therefore, in the case where the heat exchanger is formed by several platforms 80, the walls 82 of the platforms can include different numbers of fins 100.

Each fin 100 extends in the secondary duct 20, further favouring the thermal exchanges between the flow of fluid and the flow of air in the secondary duct 20.

Preferably, each fin 100 extends mainly according to the axial direction of the platform 80, so as to limit the disturbances in the flow of air in the secondary duct 20.

Regardless of the embodiment of the line 84, the platform 80 includes an inlet port 90 through which the flow of fluid penetrates into the line 84 and an outlet port 92 through which the cooled flow of fluid exits from the line 84.

According to a first embodiment not shown, the ports 90, 92 are located at the same axial end of the platform 80.

According to a second embodiment shown in the figures, each one of the inlet port 90 and of the outlet port 92 is disposed at one of the upstream axial end 94 of the platform 80 or of the downstream axial end 96 of the platform 80.

It shall be understood that here, the upstream axial end 94 of the platform 80 is the axial end of the platform 80 located upstream from the platform 80 according to the direction of flow of the flow of air in the secondary duct, i.e. the left axial end in FIG. 1 and the downstream axial end 96 of the platform 80 is the axial end of the platform 80 located downstream of the platform 80 according to the direction of flow of the flow of air in the secondary duct, i.e. the right axial end in FIG. 1.

According to a first embodiment shown for example in FIG. 5, the inlet port 90 is located at the upstream end 94 of the platform 80 and the outlet port 92 is located at the downstream end 96 of the platform 80.

According to a second embodiment, shown in FIG. 3, the inlet port 90 is located at the downstream end 96 of the platform 80 and the outlet port 92 is located at the upstream end 94 of the platform 80.

According to this second embodiment, the direction of flow of the flow of fluid in the platform 80 is contrary to the direction of flow of the flow of air in the secondary duct. The heat exchange then has better efficiency.

Figure 7:
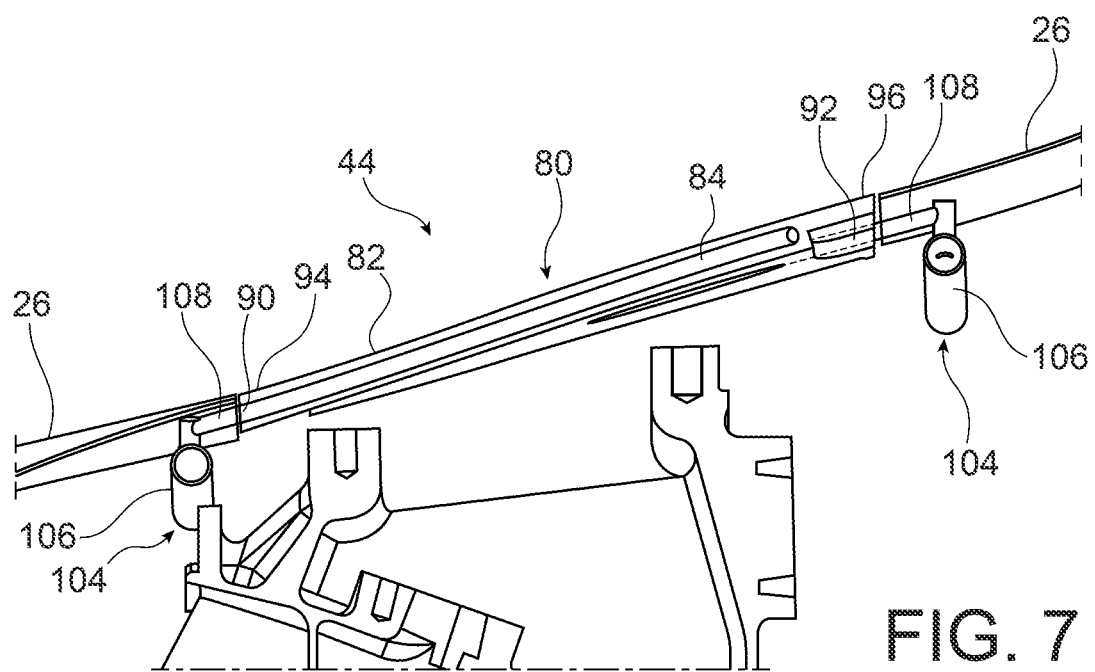
FIG. 7 is a detail of a cross-section view of a portion of the turbine engine shown in FIG. 1, showing the presence of distributors on either side of the walls.
Figure 8:
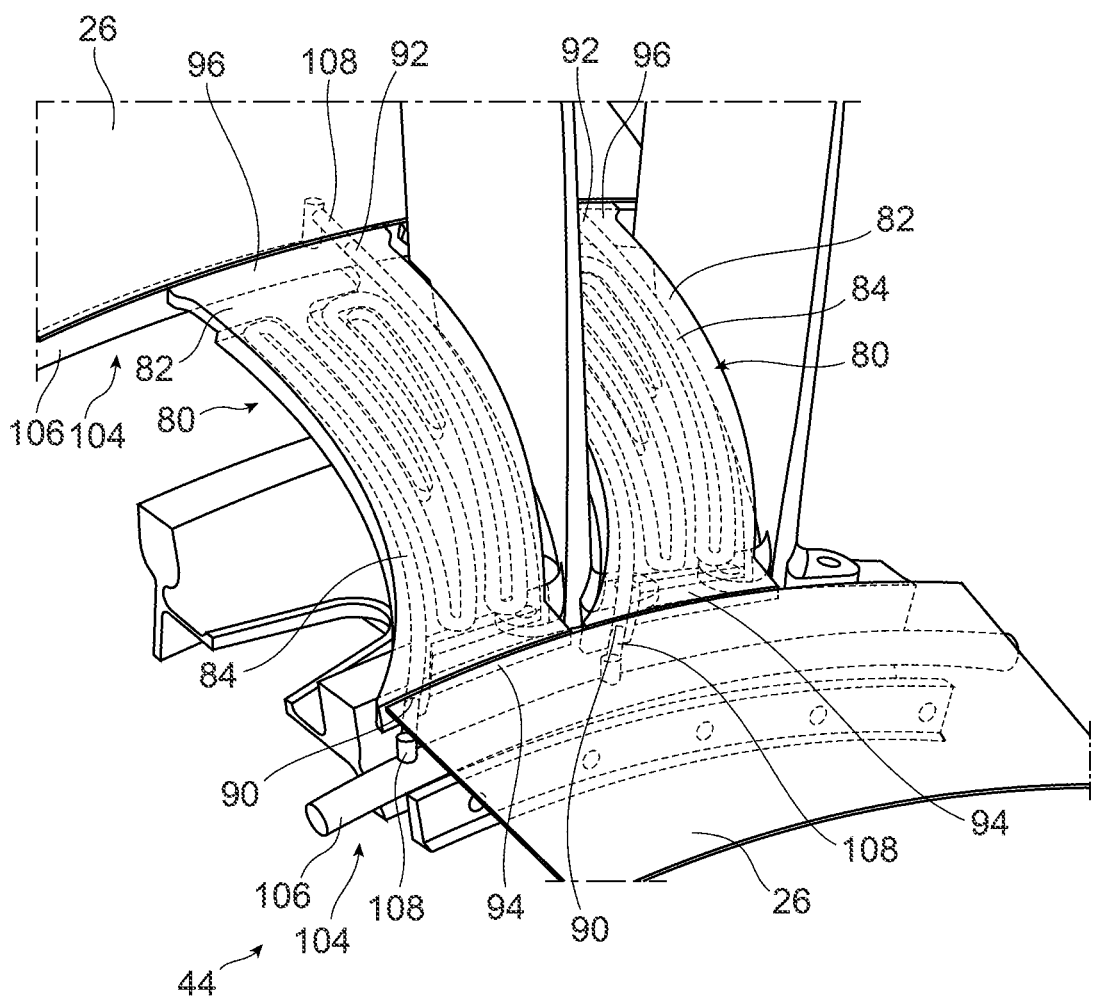
FIG. 8 is a detail in perspective on a larger scale of a portion of the stator showing the installation of the distributors connected to the lines of two platforms.

As can be seen in FIGS. 7 and 8, the fluid circuit 40 also includes a distributor 104 that is associated with each port 90, 92 of each platform 80 forming, at least partially, the heat exchanger 44.

According to the embodiment for which the heat exchanger 44 is comprised of several platforms 80, as can be seen for example in FIG. 8, the same distributor 104 is associated with all the inlet ports 90 of the platforms and the same distributor 104 is associated with all the outlet ports 92.

Each distributor 104 is located axially facing and at a distance from each port 90, 92 with which it is associated.

Thus, when each port 90, 92 is arranged at one of the two axial ends 94, 96 of each platform 80, a first distributor 104 is axially located upstream and axially at a distance from the upstream axial end 94 of the platforms 80 and a second distributor 104 is axially located downstream and axially at a distance from the downstream axial end 96 of the platforms 80.

Likewise, according to the embodiment not shown according to which the ports 90, 92 are arranged at the same axial end 94, 96 of each platform 80, for example at the upstream axial end 94 of the platform 80, the two distributors 104 are located axially upstream and axially at a distance from the upstream axial end 94 of the platforms 80 and they are furthermore axially or radially offset with respect to one another.

According to a preferred embodiment, each distributor 104 includes a tubular line 106, which is curved to form a ring centred on the main axis A of the turbine engine. The distributor 104 also includes a plurality of couplings 108 of which each coupling 108 is associated with a platform 80 of the heat exchanger 44, which connects the line 106 to the port 90, 92 of the platform 80 that is associated with the distributor 104.

Thus, the fluid circuit 40 includes, in addition to the components that were mentioned hereinabove, a distributor 104 such as described hereinabove which is disposed between the upstream section 116 and the inlet port 90 of each platform 80 of the heat exchanger 44 and the other distributor 104 which is disposed between the outlet port 92 of each platform 80 of the heat exchanger 44 and the downstream section 118 of the fluid circuit 40.

Each distributor 104 thus forms a distributor that makes it possible to connect each line 84 formed in a platform 80 to the upstream section 116 or to the downstream section 118 of the fluid circuit 40.

This is particularly advantageous in the case of a heat exchanger 44 formed from a plurality of platforms 80 distributed around the main axis A of the turbine engine 10.

The invention has been described in reference to a fluid circuit 40 wherein a lubrication oil of at least one component 110 circulates.

It shall be understood that the circuit 40 can be passed through by any other fluid, in particular fluid intended for example for the pressurisation of lubrication oil enclosures in order to prevent oil from exiting from these enclosures or intended for the cooling of a component of the turbine engine such as the low-pressure shaft for example.

The invention claimed is:

1. A turbine engine of an aircraft comprising:
a primary air flow duct;
a secondary air flow duct which is located around the primary air flow duct, the secondary air flow duct including a stator including
a plurality of blades distributed around a main axis of the turbine engine, and
inter-blade platforms, each of the inter-blade platforms being located between radially internal ends or between radially external ends of two adjacent blades of the plurality of blades, each inter-blade platform including a wall partially delimiting the secondary air flow duct; and
a fluid circuit that supplies fluid to a component of the turbine engine,
wherein the fluid circuit includes a heat exchanger configured to carry out a heat exchange between the fluid and a flow of air flowing in the secondary air flow duct, which is formed by at least one of the inter-blade platforms through which the at least one of the inter-blade platforms the fluid flows,
wherein the at least one of the inter-blade platforms includes a line that has an inlet port of the fluid and an outlet port of the fluid, and
wherein the fluid circuit includes a first distributor associated with the inlet port of the at least one of the inter-blade platforms and a second distributor associated with the outlet port of the at least one of the inter-blade platforms with a remainder of the fluid circuit and the first and second distributors are axially offset with respect to the at least one of the inter-blade platforms along the main axis.

2. The turbine engine according to claim 1, wherein the heat exchanger is formed by multiple inter-blade platforms which are distributed around the main axis and each of the first and second distributors is respectively connected to the inlet ports and outlet ports of all of the multiple inter-blade platforms that form the heat exchanger.

3. The turbine engine according to claim 1, wherein each of the first and second distributors includes a tubular line curved to form a ring centered on the main axis of the turbine engine and a coupling associated with the at least one of the inter-blade platforms, connecting the tubular line to the inlet port and the outlet port of the at least one of the inter-blade platforms.

4. The turbine engine according to claim 1, wherein the inlet port is located at a first axial end of the at least one of the inter-blade platforms and the outlet port is located at a second axial end of the at least one of the inter-blade platforms, and the first and second distributors are disposed axially facing the first and second axial ends of the at least one of the inter-blade platforms.

5. The turbine engine according to claim 1, wherein the fluid circuit includes, in a direction of flow of the fluid in the fluid circuit:
a fluid reservoir;
a supply line of the component of the turbine engine extending from the fluid reservoir to the component;
the component;
an upstream section extending from the component to the heat exchanger;
the first distributor;
the at least one of the inter-blade platforms;
the second distributor; and
a downstream section extending from the second distributor to the fluid reservoir.

6. The turbine engine according to claim 1, the wall of the at least one of the inter-blade platforms includes at least one protruding fin extending inside the secondary air flow duct.

7. The turbine engine according to claim 6, wherein the at least one protruding fin extends mainly according to a direction of the main axis.

8. The turbine engine according to claim 1, wherein the line is a single piece with at least one portion of the at least one of the inter-blade platforms.

9. The turbine engine according to claim 1, wherein the line consists of a cavity formed in a body of the at least one of the inter-blade platforms and the wall of the at least one of the inter-blade platforms is added onto the body and partially delimits the cavity.

10. The turbine engine according to claim 1, wherein the line consists of an insert which is fixed to the wall of the at least one of the inter-blade platforms.

* * * * *